United States Patent [19]

O'Connell

[11] 4,165,156

[45] Aug. 21, 1979

[54] OUTSIDE MOUNTED VEHICLE MIRROR WITH MULTIPLE ROTATION AXES

[75] Inventor: Lawrence E. O'Connell, Doylestown, Pa.

[73] Assignee: Delbar Products, Inc., Perkasie, Pa.

[21] Appl. No.: 921,378

[22] Filed: Jul. 3, 1978

[51] Int. Cl.² .......................... G02B 5/08; A47G 1/24
[52] U.S. Cl. ................................ 350/307; 248/478; 248/484; 248/486
[58] Field of Search ................ 350/307; 248/477, 478, 248/479, 481–487

[56] References Cited

U.S. PATENT DOCUMENTS

| 3,189,309 | 6/1965 | Hager | 248/478 |
|---|---|---|---|
| 3,346,229 | 10/1967 | Carson | 248/477 |
| 3,667,718 | 6/1972 | Goslin et al. | 248/487 |
| 3,730,474 | 5/1973 | Bowers | 248/478 |
| 4,077,597 | 3/1978 | Greig | 248/477 |
| 4,105,296 | 8/1978 | Tomlin | 350/307 |

FOREIGN PATENT DOCUMENTS

658679 10/1951 United Kingdom ............... 350/307

*Primary Examiner*—Jon W. Henry
*Attorney, Agent, or Firm*—Reising, Ethington, Barnard, Perry & Brooks

[57] ABSTRACT

An outside mounted vehicle mirror assembly including a unitary mirror head supporting bracket rotatable between a storage position generally parallel to the vehicle side wall and another position generally normal to the vehicle side wall and further wherein the mirror head is supported upon the unitary bracket for movement between inboard and outboard rearward viewing positions.

17 Claims, 6 Drawing Figures

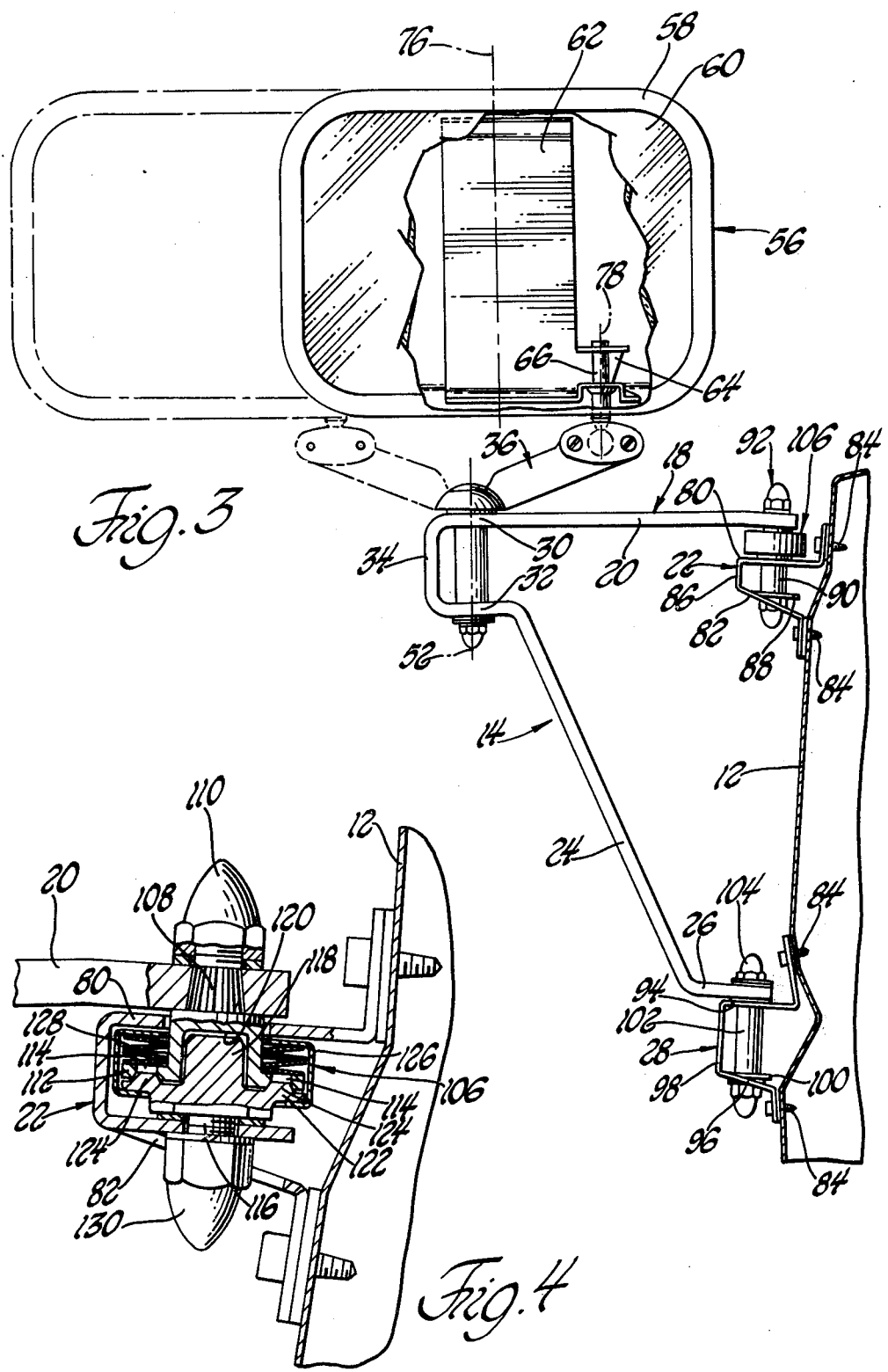

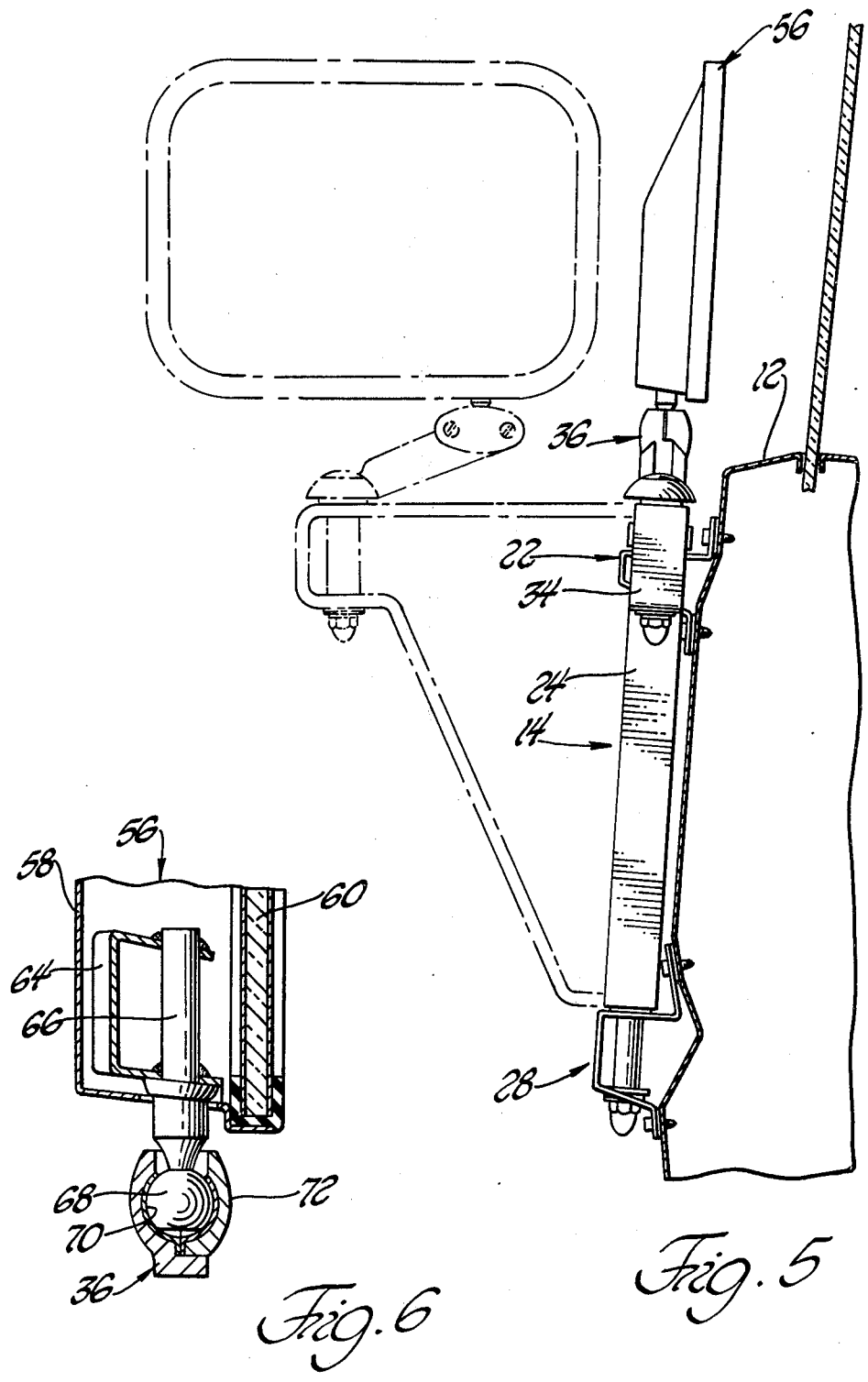

OUTSIDE MOUNTED VEHICLE MIRROR WITH MULTIPLE ROTATION AXES

TECHNICAL FIELD

The present invention relates to a mirror assembly of the type adapted to be mounted on an outside panel of a vehicle wherein the mirror head may be positioned alternatively between inboard and outboard viewing positions to accommodate unobstructed rearward viewing through the mirror depending on whether or not the vehicle is carrying a rearwardly disposed cargo which tends to interfere with the rearward field of vision. The mirror assembly of the present invention is particularly adapted for use with vehicles adapted to carry rearwardly disposed cargoes or to have a towed vehicle therebehind the latter which can alter or interfere with the normal rearward vision through the mirror. Normally it is desired to have a rearward viewing outside mirror positioned as close as possible to the outer panel of the vehicle. However, where such vehicle is adapted to carry a rear cargo load or to tow another vehicle, then, it is desirable to have the mirror head laterally shiftable to an outboard position to maintain the same rearward viewing capability.

DISCLOSURE OF THE INVENTION

The general problem with any heavy duty outside mounted mirror and particularly those of the type laterally shiftable between inboard and outboard viewing positions, is in avoiding as much vibration as is possible so as to eliminate or reduce blurring of the rearwardly disposed images being reflected through the mirror. Accordingly, it is a primary objective of the subject invention to provide a rigidified mirror head support structure which also reduces the number of mirror head supporting elements as compared with previous types of mirror assemblies. More specifically, it is an object of the present invention to provide a uniquely constructed integral or one-piece support bracket to replace the multi-piece support brackets of prior art designs.

It is also an object of the present invention to utilize a one-piece supporting bracket or mirror head supporting structure which is adapted to be pivotally mounted to the outside vehicle panel such that the supporting bracket and mirror head may be rotated from an outboard rearward viewing position to a folded-back or storage position generally parallel to the outside panel of the vehicle. The latter folded-back or storage position of the mirror assembly is inoperative for rearward viewing but is useful in preventing damage to the mirror assembly when the vehicle is in a non-driving condition or storage situation where damage to the mirror assembly is otherwise possible. In other words, the mirror assembly of the subject invention has a first position in which the mirror head and supporting structure is folded back or stored against the vehicle for non-viewing operation and a second position in which the mirror head supporting bracket or structure is rotated to a second outward position, generally normal to the vehicle panel, for rearward viewing operation. It is from the second or outboard position of the mirror head supporting bracket that the mirror head is also positionable between laterally inboard and outboard rearward viewing positions depending on the presence or absence of rearwardly disposed cargo being hauled by the vehicle.

The means for pivotally supporting the mirror head support bracket upon the outside vehicle panel also incorporates a detent device which permits simple and accurate positioning of the mirror head support bracket between its normal outward position and its folded-back or storage position.

BACKGROUND ART

The concept of an inboard/outboard type mirror assembly for a utility type vehicle is shown in Pat. No. 3,667,718 Goslin et al. The Goslin et al patent utilizes a relatively long and therefore vibration prone L-shaped mirror head supporting arm which is rotatably supported upon the outer end of a multi-piece support bracket structure for rotation of the arm and mirror head about a vertical axis. At the same time the L-shaped member includes a horizontal leg to which the mirror head is fixed for rotation about a horizontal axis. As is apparent from the Goslin mirror head supporting arrangement, in both its inboard and outboard positions, the center of gravity of the mirror head is substantially laterally offset from the vertical axis of rotation of the L-shaped mirror head support arm. In other words, the center of gravity of Goslin's mirror head is suspended at the end of a relatively long moment arm which tends to allow the mirror head to vibrate and thus blur the image being rearwardly viewed through the mirror. Through Applicant's unique mirror head supporting arrangement, the center of gravity of the mirror head tends to be positioned more closely to the vertical axis of rotation of the mirror head support arm thereby reducing the tendency of the mirror head to vibrate.

Also as contrasted with Goslin's relatively long L-shaped mirror head support arm, Applicant utilizes a very short and rigid straight or linear mirror head support arm which further reduces the tendency of the mirror head support structure to vibrate. Whereas the overall length of Goslin's L-shaped mirror head support arm is substantially longer than the width of his mirror head, Applicant's short and rigid mirror head support arm has a length substantially less than the width of his mirror head.

It is aesthetically and aerodynamically desirable to reduce the number of components constituting the mirror head supporting bracket or platform. Accordingly, Applicant has developed an integral or single-piece mirror head supporting bracket formed with certain rigidifying features so as to provide a solid base or platform upon which to support the mirror head. Furthermore, when required to use a multi-part supporting bracket structure, such as shown in Goslin et al, it is impossible to incorporate a mounting structure wherein the mirror head and supporting bracket may be folded back or stored against the outside vehicle panel. To achieve a more simplified mirror head support bracket as well as means for swingably supporting said bracket and mirror head relative to the outside vehicle panel, Applicant has utilized reinforced box-like cross sections in his various mirror head supporting structures which add to the overall rigidity of his mirror head assembly.

While Applicant is unaware of any mirror assembly providing a mirror head having inboard/outboard rearward viewing mirror head positions in combination with means for folding back or storing the entire assembly against the vehicle, it is to be noted that an outside mirror having a fold-back or storage feature is shown in U.S. Pat. No. 3,730,474 Bowers, also assigned to the assignee of the subject invention.

PRESENT INVENTION

The present invention utilizes a unitary or one-piece mirror head supporting bracket having a box-like cross section at its laterally outermost end and also includes a generally horizontally disposed upper leg portion extending inwardly from the box-like cross section for pivotal support upon the outside vehicle panel through a first bracket means which also incorporates a box-like cross section. Also extending inwardly and downwardly from the lower portion of the box-like cross section is a second leg portion similarly supported to the vehicle panel upon a second bracket means. A short and linear mirror head support arm is supported at one end at the box-like outer section of the unitary bracket member and is connected to a reinforcing tubular sleeve disposed within the box-like bracket member section and which sleeve has a substantially vertical axis about which the support arm can rotate. The linear support arm includes another end upwardly inclined to the bracket member. The mirror head includes an integral shaft member having an axis laterally offset from the transverse mid-plane of the mirror head and which shaft projects exteriorly of the mirror head and is mounted upon the other end of the mirror head support arm so as to enable the mirror head to be rotated about the shaft axis. Thus, to position the mirror head between its inboard and outboard rearward viewing positions, the mirror head support arm is rotated about the first vertical sleeve axis at the same time as the mirror head is rotated about the second and laterally offset shaft axis in such a way as to avoid the "flipping over" of the mirror head as is required by the Goslin et al type mirror head support structure.

The details of the invention are set forth in the following detailed description and shown in the accompanying drawings.

BRIEF DESCRIPTION OF THE DRAWINGS

FIG. 3 is a view along line 3—3 of FIG. 1 and showing the mirror head in its inboard and outboard rear viewing positions;

FIG. 4 is a modified position of the detent device disposed within the upper supporting bracket means;

FIG. 5 is a view showing the mirror assembly in its folded-back or storage position; and FIG. 6 is a view along line 6—6 of FIG. 2.

BEST MODE FOR CARRYING OUT THE INVENTION

Figure 1:
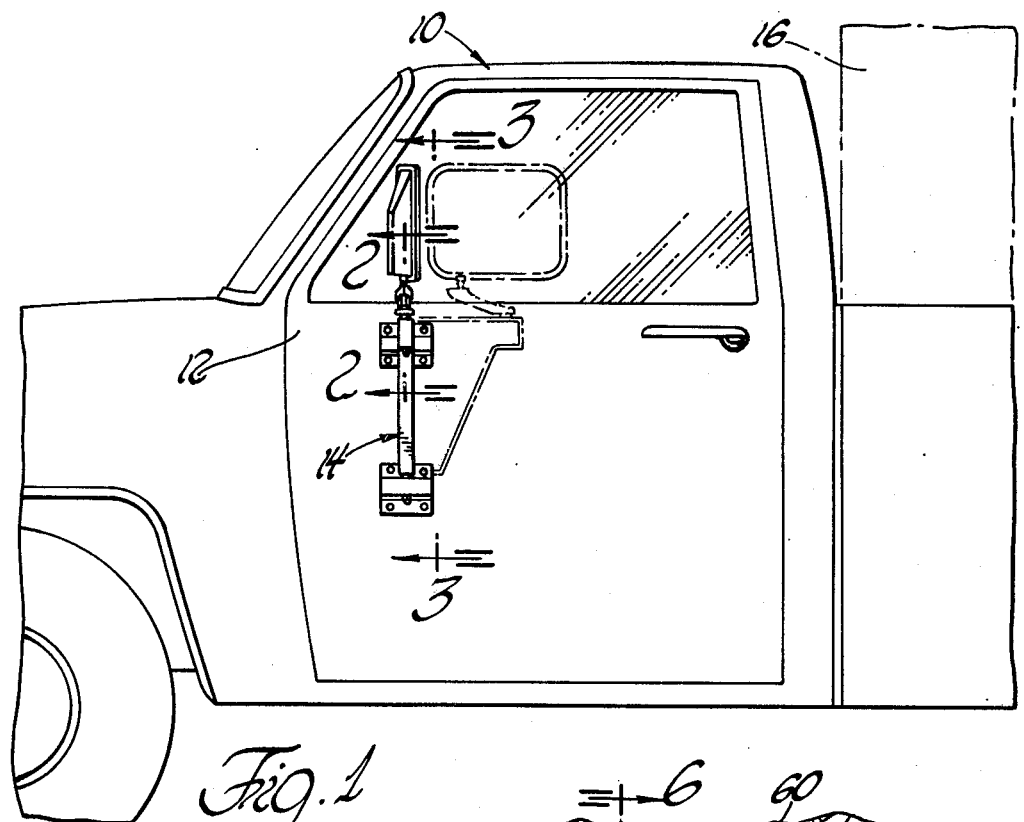
FIG. 1 is a side elevation view of a vehicle embodying the subject mirror assembly.
Figure 2:
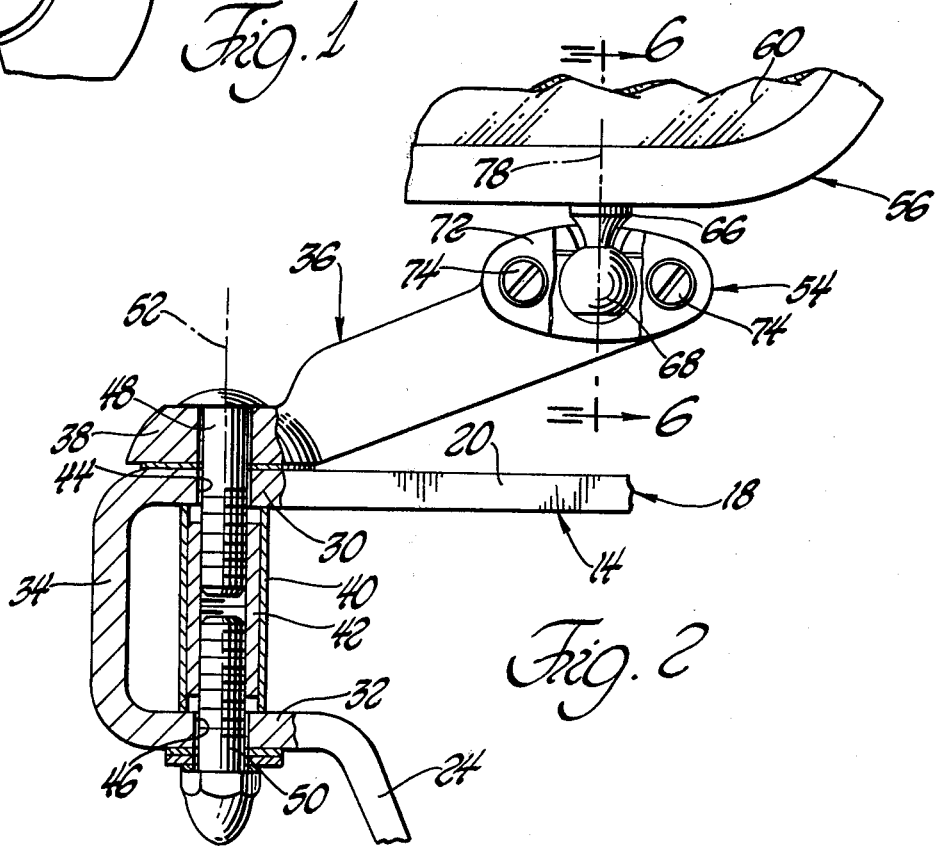
FIG. 2 is a partially sectioned view along line 2—2 of FIG. 1.

Referring particularly to FIGS. 1 and 2 of the drawings, a utility-type vehicle is indicated generally at 10 and includes an outside side panel 12 to which mirror assembly, indicated generally at 14, is mounted. The mirror assembly of the present invention is particularly adapted for use with vehicles in which the presence or absence of a rearwardly disposed load or cargo, e.g. 16, changes the rearward field of vision viewable through the mirror and which mirror, therefore, is laterally shiftable between inboard and outboard rear viewing positions in order to maintain a more or less constant rear viewing capability.

Referring now more particularly to FIG. 3 of the drawings, the mirror assembly 14 includes a unitary or one-piece mirror head supporting bracket indicated generally at 18. Bracket 18 includes a first laterally and normally horizontally extending upper leg portion 20 having an inner end adapted to be mounted through first bracket means 22 to vehicle panel 12. Bracket 18 includes a second downwardly and inwardly inclined leg portion 24 which terminates at its lower inner end in a horizontally extending portion 26 also adapted to be pivotally mounted to vehicle panel 12 through a second bracket means indicated generally at 28.

Bracket leg portions 20 and 24 include laterally extending parallel portions 30 and 32 connected by an outer generally vertical portion 34 and which portions together form a box-like cross section at the laterally outer end of mirror head support bracket 18. The box-like cross section formed by bracket portions 30, 32, and 34 is provided to rigidify bracket member 18.

A linear or straight mirror head support arm is indicated at 36 and includes a first end 38 adapted to be supported upon bracket member 18 at the box-like outer portion thereof.

As best seen in FIG. 2, the means for mounting support arm 36 upon bracket 18 includes a tubular sleeve element 40 disposed between parallel bracket portions 30 and 32 and which tubular element includes an internally threaded member 42 loosely disposed therewithin. The box-like section of bracket member 18 includes a pair of holes 44 and 46 coaxially aligned with tubular sleeve 40. A first stud member 48 extends through an opening in end 38 of support arm 36 and through bracket hole 44 to be internally threaded to sleeve member 42. A second stud member 50 extends upwardly through bracket hole 46 and is likewise internally threaded to sleeve member 42. Thus, sleeve 40 and stud members 48 and 50 include a common and generally vertically extending axis 52 about which support arm 36 is rotatable through 360°.

Support arm 36 includes another end 54 upwardly inclined from bracket leg portion 20 and laterally spaced from support arm end 38 and vertical axis 52.

A mirror head is indicated generally at 56 and includes a hollow shell portion 58 enclosed at its open end by mirror member 60. As best seen in FIG. 3, an internal bracket 62 is fixed within mirror shell 58 and includes a lateral projection 64 to which a stud or shaft 66 is fixed. The lower end of shaft 66 terminates in a ball member 68 which projects downwardly exteriorly of mirror head shell 58 and is adapted to be supported on end 54 of support arm 36. End 54 of support arm 36 includes a ball-shaped recess 70 to receive the ball stud member 68 of shaft 66 and be retained therewithin by removable plate member 72 which, through stud members 74, adjustably clamps the shaft ball to support arm 36.

Again referring to FIG. 3, mirror head 56 includes a transverse midplane indicated generally at 76 through which the center of gravity of the mirror head acts. It is to be noted that the axis 78 of mirror head shaft 66 is normally parallel to the transverse midplane 76 and laterally offset therefrom. Thus, mirror head 56 is asymmetrically supported through shaft 66 to support arm 36.

It is also to be noted that the length of support arm 36 is substantially less than the overall width of mirror head 56. It is, therefore, possible with the subject invention to use a very short mirror head support arm 36 since the mirror head 56 is only rotated about the axis 78 of mirror head support shaft 66 as the mirror head is moved between its inboard position, as shown in FIG.

3, and its outboard position, as shown in dotted lines in FIG. 3, and does not have to be flipped over as with a mirror of the type shown in previously noted Goslin U.S. Pat. No. 3,667,718. The advantage of the short or closely coupled support arm 36 is that such is rigid thereby reducing the tendency of the mirror to vibrate.

With the mirror head in its inboard position, as shown in FIG. 3, the transverse plane 76 is disposed between the vertical bracket axis 52 and mirror head shaft axis 78.

Thus, the center of gravity of the mirror head when in its inboard position passes very close to the vertical axis of rotation 52 of support bracket 18. Even with the mirror head in its outboard position, shown in dotted lines in FIG. 3, the short length of support arm 36 enables the center of gravity of the mirror head to act through a moment arm only slightly greater than the length of support arm 36 in relation to vertical support bracket axis 52. Thus, an important aspect in rigidifying the subject mirror assembly resides in shortening the distance over which the center of gravity of the mirror head acts in relation to the point at which the mirror head and support arm are mounted upon bracket member 18. In other words, the shorter the lateral distance between the center of gravity of mirror head 56 and vertical bracket axis 52, the less is the tendency of the mirror head to vibrate.

Reference is now made to the first and second bracket means 22 and 28 whereby mirror head supporting bracket 18 is pivotally supported to outer vehicle panel 12. Both the first and second bracket means 22 and 28 have box-like cross sections and include a plurality of angularly related members. The precise shape of such box-like cross sections will be determined by the contour of the outside vehicle panel 12. The first bracket means 22 includes a pair of vertically spaced, laterally extending leg portions 80 and 82 having upwardly and downwardly extending flange portions at the respective inner ends thereof and which flanges are adapted to be abuttingly positioned against the outer vehicle panel and secured thereto through fastening means such as self-tapping screws 84. The outer ends of lateral leg portions 80 and 82 are connected by a common, generally vertical portion 86. In order to reinforce the box-like cross section of bracket means 22, a tap portion 88 is struck from lower laterally extending leg 82 and which tab is disposed in parallel relationship to upper leg portion 80. A tubular sleeve 90 is then disposed between tab portion 88 and upper leg portion 80. A stud means indicated generally at 92 extends coaxially through the inner end of the upper leg portion 20 of bracket member 18 and through suitable openings in portions 80 and 82 of the first bracket means 22 to pivotally support the upper portion of bracket member 18 upon the door panel 12.

The second bracket means 28 is of a similar construction and includes laterally extending portions 94 and 96 having upwardly and downwardly extending flanges formed at the inner ends thereof and adapted to be connected to vehicle panel 12 through suitable self-tapping screw members 84. Once again, the laterally extending bracket means portions 94 and 96 are connected at their outer ends by a depending portion 98 so as to form a rigidified, box-like cross section. The lower, laterally extending portion 96 of the second bracket means again includes a tang portion 100 struck therefrom so as to be generally parallel with the upper portion 94. A tubular reinforcing sleeve 102 is disposed between tang 100 and upper portion 94. Stud means 104 extend through the laterally extending portion 26 of bracket member 18 to pivotally support the lower end of the bracket member to the outer vehicle panel 12. In this way the mirror support bracket 18 is pivotally supported at its upper and lower ends to vehicle panel 12 so as to position the bracket member between its fully outwardly projecting position, as shown in FIGS. 1 through 4 of the drawings, and a folded-back or storage position in which bracket member 18 is disposed generally parallel to the outside vehicle panel 12 and as shown in FIG. 5 of the drawings. The folded-back or storage position for the mirror assembly is a non-rearward viewing position and is utilized only to move the assembly to a position where the assembly is otherwise subject to damage if it were in its fully laterally extended position generally normal to the vehicle panel surface.

To facilitate the simple and accurate positioning of the mirror arm support bracket 18 between its laterally outwardly extended or rear viewing position and its folded-back or storage position, a detent device indicated generally at 106 is incorporated with the upper bracket means 22. It is to be understood, however, that such detent device could be incorporated in either the upper or lower of the bracket means.

The details of the detent device 106 are shown in FIG. 4. The only difference between the modifications shown in FIGS. 3 and 4 is that in FIG. 3 the detent device is disposed exteriorly of the upper bracket means 22 whereas in FIG. 4 such detent device is disposed within the box-like cross section of the bracket means and which latter positioning of the detent device protects the latter from possible damage and also makes the overall mirror assembly more compact.

The detent device 106 is basically the same as that shown in aforementioned U.S. Pat. No. 3,730,474 Bowers and is not, per se, being claimed in the present invention. Referring to FIG. 4, the detent device includes a first stud or upper shaft member 108 adapted to be fixed at its upper end through a suitable splined nut means 110 to the inner end of upper bracket arm 20. The inner end of shaft member 108 includes a radially extending flange 112 having a first pair of diametrically disposed holes 114 formed therethrough. A second pair of diametrically disposed holes, not shown, are disposed at 90° to holes 114. A second and coaxially related lower shaft member 116 includes a guide portion 118 projecting within a corresponding recess 120 in upper shaft member 108 such that the upper shaft member and bracket 18 may rotate relative to the lower shaft member 116. The lower shaft member also includes a radially extending flange portion 122 having a pair of diametrically aligned detents 124 formed thereon and adapted to recess within holes 114 of the upper shaft member to locate the bracket in its laterally outward position, as shown in FIG. 4 of the drawings. A casing 126 encloses the radial flanges 112 and 122 of shaft members 108 and 116 and also provides an upper seat for a series of Belleville springs 128 the bottommost of which biases against the radial flange 112 of upper shaft member 108 to maintain the locating holes in engagement with detents 124. Thus, as bracket member 18 is rotated, the detents 124 of fixed shaft 116 cause the aligned holes 114 of upper shaft member 108 to be cammed or moved axially out of engagement with the detents until the mirror support bracket member 18 has been moved essentially through 90° at which time a second set of holes in radial flange 112 become aligned with detents 124 to locate the second or folded-back position of the bracket member. In this way, the detents provide a quick locating means whereby the mirror support bracket 18 is positioned in either one of two positions. By loosening a lower nut member 130, the lower or fixed shaft 116 may be rotated to vary the position of the detents and thereby adjust the outward and stored positions of bracket 18.

In summary, the mirror assembly of the present invention includes a unitary and rigidified mirror head support bracket 18 which is pivotally supported at its inner ends to the outside vehicle panel 12 such that the bracket may be positioned in either a first outward or fully extended position or a second folded-back storage position adjacent the vehicle panel and further which assembly includes a short rigid mirror head support arm 36 pivoted at one end to the outer box-like section of the support bracket and which arm supports the mirror head 56 at its other end in such a way that the support arm and mirror head may be rotated about substantially vertical axes 52 and 78 to position the mirror head between inboard and outboard rear viewing positions.

Other modifications of the subject invention may be made within the intended scope of the hereinafter appended claims.

What is claimed is:

1. A mirror assembly for mounting on an outside vehicle panel, said assembly including an integral bracket member having a laterally extending leg portion with an inner end disposed proximate said vehicle panel and a downwardly and inwardly inclined leg portion having an inner end disposed proximate said vehicle panel, a linear support arm having a first end supported proximate the laterally outer portion of said bracket member for rotation about a substantially vertical axis, said support arm including a second end upwardly inclined at an acute angle to the laterally extending leg portion of said bracket member, and a mirror head having a transverse mid-plane, said mirror head including a support shaft having an axis generally parallel to and laterally offset from said transverse mid-plane, said support shaft including an end projecting exteriorly of said mirror head and supported upon said other end of said support arm to permit rotation of the mirror head about the axis of said support shaft, first and second bracket means respectively pivotally connecting the inner ends of the bracket member to said vehicle panel whereby the bracket member may be positioned between a fully extended laterally outward position and a folded-back storage position generally parallel to the vehicle panel.

2. A mirror assembly for mounting on an outside vehicle panel, said assembly including an integral bracket member having a laterally extending leg portion secured at its inner end to said vehicle panel and a downwardly and inwardly inclined leg portion having an inner end secured to said vehicle panel at a point spaced vertically below the inner end of the lateral leg portion, a linear support arm having a first end supported proximate the laterally outer portion of said bracket member for rotation about a substantially vertical axis, said support arm including a second end upwardly inclined at an acute angle to the laterally extending leg portion of said bracket member, and a mirror head having a transverse mid-plane, said mirror head including a support shaft having an axis generally parallel to and laterally offset from said transverse mid-plane, said support shaft including an end projecting exteriorly of said mirror head and supported upon said other end of said support arm to permit rotation of the mirror head about the axis of said support shaft.

3. A mirror assembly for mounting on an outside vehicle panel, said assembly including a one-piece bracket member having a first laterally extending leg portion secured at its inner end to said vehicle panel and a second downwardly and inwardly inclined leg portion having an inner end secured to said vehicle panel at a point spaced vertically below the inner end of said first leg portion, the upper end of said second leg portion and the laterally outer end of said first leg portion merging to form a box-like section at the laterally outermost portion of said bracket member, said box-like section comprising a pair of substantially horizontal and vertically spaced portions joined at their outer ends by a substantially vertical portion, a tubular reinforcing member mounted between said pair of vertically spaced portions and disposed within the box-like section of said bracket member, said tubular member having a substantially vertical axis, a linear support arm having a first end connected to said tubular member for rotation about the vertical axis of the latter, the support arm including a second end upwardly inclined at an acute angle to the first laterally extending portion of the bracket member, and a mirror head having a transverse mid-plane, said mirror head including a support shaft mounted at one end interiorly of said mirror head, said shaft having an axis generally parallel to and laterally offset from said transverse mid-plane, said support shaft including an end projecting exteriorly of the mirror head and supported upon the second end of the linear support arm to permit rotation of the mirror head about the support shaft axis.

4. A mirror assembly of the type set forth in claim 3 wherein said mirror head is of a rectangular shape and has a width greater than its height, the overall length of said linear support arm being less than the width of said mirror head.

5. A mirror assembly as set forth in claim 3 wherein the lateral distance between the axis of said tubular reinforcing member and the axis of the mirror head support shaft is less than the width of said mirror head.

6. A mirror assembly for mounting on an outside vehicle panel, said assembly including an integral bracket member having a first laterally extending leg portion with a inner end disposed proximate said vehicle panel and a second downwardly and inwardly inclined leg portion having an inner end disposed proximate said vehicle panel at a point vertically spaced below the inner end of said first leg portion, a first bracket means secured to said vehicle panel and pivotally supporting the inner end of said first leg portion, a second bracket means secured to said vehicle panel and pivotally supporting the inner end of said second leg portion, a linear support arm having a first end supported proximate the laterally outer portion of said bracket member for rotation about a substantially vertical axis, said support arm including a second end upwardly inclined at an acute angle to the first laterally extending leg portion of said bracket member, and a mirror head, said mirror head including a support shaft having an axis laterally offset from the axis of rotation of the first end of said support arm, said support shaft including an end projecting exteriorly of said mirror head and supported upon the second end of said support arm to permit rotation of the mirror head about the vertical axis of said support shaft.

7. A mirror assembly as set forth in claim 6 wherein the exteriorly projecting end of the mirror head shaft includes a ball member, said other end of the support arm including a ball socket to receive said ball member whereby the mirror head may be tilted and rotated relative to said support arm.

8. A mirror assembly of the type set forth in claim 6 wherein the first and second bracket means each includes a box-like element comprising a pair of laterally extending and vertically spaced portions connected at their outer ends by a common connecting portion normal to at least one of said laterally extending portions, the upper laterally extending portion of said element terminating at its inner end in an upwardly extending flange, the lower laterally extending portion of said element terminating in a downwardly extending flange, said flanges being disposed in abutting relationship with said vehicle panel, a tubular reinforcing member disposed between the laterally extending portions of each support element and stud means extending through said tubular reinforcing members so as to pivotally secure said integral bracket member to said bracket means whereby said integral bracket member may be rotated between a fully extended position generally normal to the vehicle panel and a storage position parallel to said panel.

9. A mirror assembly as set forth in claim 8 wherein one of said bracket means includes a detent device for releasably retaining the integral bracket member in either its fully extended position or its storage position.

10. A mirror assembly for mounting on an outside vehicle panel, said assembly including an integral bracket member comprising a plurality of angularly related portions which include a first laterally extending upper leg portion having an inner end disposed proximate said panel, a second portion depending generally vertically from the laterally outer end of said first upper leg portion, a third portion projecting laterally inwardly from the lower end of said depending portion and generally parallel to said upper leg portion, a fourth leg portion extending downwardly and inwardly from said third laterally extending portion, the lower end of said fourth downwardly and inwardly projecting leg portion terminating in a fifth inwardly extending lateral portion having an inner end generally vertically aligned with the inner end of said first upper leg portion, said first upper leg portion, said second depending portion, and said third laterally inwardly extending portion defining a box-like cross section at the laterally outermost portion of said bracket member, means for pivotally supporting the inner ends of the first and fifth portions of the integral bracket upon said vehicle panel, a tubular sleeve supported within the box-like section of said bracket member and having a generally vertically disposed axis, a support arm upwardly inclined at an acute angle to said first upper leg portion of the bracket member and having transversely spaced lower and upper ends, stud means connected to said tubular sleeve and supporting the lower end of the support arm upon said integral bracket member for rotation about said sleeve axis, and a mirror head, said head including a support shaft having an axis laterally offset from said sleeve axis, said support shaft including an end projecting exteriorly of said mirror head and rotatably supported to the upper end of said support arm.

11. A mirror assembly for mounting on an outside vehicle panel, said assembly including an integral bracket member comprising a plurality of angularly related portions which include a first laterally extending upper leg portion having an inner end disposed proximate said panel, a second portion depending generally vertically from the laterally outer end of said first upper leg portion, a third portion projecting laterally inwardly from the lower end of said depending portion and generally parallel to said upper leg portion, a fourth leg portion extending downwardly and inwardly from said third laterally extending portion, the lower end of said downwardly and inwardly projecting leg portion terminating in a fifth inwardly extending lateral portion having an inner end generally vertically aligned with the inner end of said first upper leg portion, said first upper leg portion, said second depending portion, and said third laterally inwardly extending portion defining a box-like cross section at the laterally outermost portion of said bracket member, a first bracket means for supporting the inner end of said first upper leg portion to said panel, a second bracket means for supporting the laterally inner end of said fifth bracket portion to said panel, a tubular sleeve supported within the box-like section of said bracket member and having a generally vertically disposed axis, a support arm upwardly inclined at an acute angle to said first upper leg portion of the bracket member and having transversely spaced lower and upper ends, stud means connected to said tubular sleeve and supporting the lower end of the support arm upon said integral bracket member for rotation about said sleeve axis, and a mirror head having a transverse mid-plane, said head including a support shaft having an axis laterally offset from and generally parallel to said mid-plane, said support shaft including an end projecting exteriorly of said mirror head and rotatably supported to the upper end of said support arm.

12. A mirror head assembly as set forth in claim 11 wherein the overall length of said support arm is less than the width of said mirror head.

13. A mirror assembly for mounting on an outside vehicle panel, said assembly including an integral bracket member comprising a plurality of angularly related portions which include a first laterally extending upper leg portion having an inner end disposed proximate said panel, a second portion depending generally vertically from the laterally outer end of said first upper leg portion, a third portion projecting laterally inwardly from the lower end of said depending portion and generally parallel to said upper leg portion, a fourth leg portion extending downwardly and inwardly from said third laterally extending portion, the lower end of said downwardly and inwardly projecting leg portion terminating in a fifth inwardly extending lateral portion having an inner end generally vertically aligned with the inner end of said first upper leg portion, said first upper leg portion, said second depending portion, and said third laterally inwardly extending portion defining a box-like cross section at the laterally outermost portion of said bracket member, a first bracket means for pivotally supporting the inner end of said first upper leg portion to said panel, a second bracket means for pivotally supporting the laterally inner end of said fifth bracket portion to said panel, said first and second bracket means enabling the integral bracket member to be rotatably positioned between a laterally extended position generally normal to the vehicle panel and a storage position generally parallel to said panel, a tubular sleeve supported within the box-like section of said bracket member and having a generally vertically disposed axis, a support arm upwardly inclined at an acute angle to said first upper leg portion of the bracket member and having transversely spaced lower and upper ends, stud means connected to said tubular sleeve and supporting the lower end of the support arm upon said integral bracket member for rotation about said sleeve axis, and a mirror head having a transverse mid-plane, said head including a support shaft having an axis laterally offset from and generally parallel to said mid-plane, said support shaft including an end projecting exteriorly of said mirror head and rotatably supported to the upper end of said support arm.

14. A mirror assembly as set forth in claim 13 wherein when said bracket member is in its laterally extended position the mirror head and support arm have inboard and outboard rearward viewing positions, when in its inboard position the mirror head mid-plane intersects the first upper leg portion of the bracket member intermediate the axis of the tubular sleeve and the mirror head shaft axis.

15. A mirror assembly as set forth in claim 13 wherein one of said bracket means includes a detent device for releasably retaining the bracket member in either its laterally extended or storage position.

16. A mirror assembly for mounting on an outside vehicle panel, said assembly including an integral bracket member having a first laterally extending leg portion secured at its inner end to said vehicle panel and a second downwardly and inwardly inclined leg portion having an inner end secured to said vehicle panel at a point spaced vertically below the inner end of the lateral leg portion, a linear support arm having a first end supported proximate the laterally outer portion of said bracket member for rotation about a substantially vertical axis, said support arm including a second end upwardly inclined at an acute angle to the laterally extending leg portion of said bracket member, and a mirror head, said mirror head including a support shaft having an axis laterally offset from the axis of rotation of the first end of said support arm, said support shaft including a ball-shaped end projecting exteriorly of said mirror head, the second end of said support arm including a ball socket adapted to clampingly engage the ball-shaped end of said support shaft whereby said mirror head may be tilted and rotated relative to the support arm.

17. A mirror assembly as set forth in claim 16 wherein the overall length of the linear support arm is substantially less than the width of said mirror head.

* * * * *